(12) United States Patent
Story

(10) Patent No.: US 10,030,568 B2
(45) Date of Patent: Jul. 24, 2018

(54) EXHAUST SYSTEM INTEGRITY TESTER

(71) Applicant: Dwight Eric Story, Nokesville, VA (US)

(72) Inventor: Dwight Eric Story, Nokesville, VA (US)

( * ) Notice: Subject to any disclaimer, the term of this patent is extended or adjusted under 35 U.S.C. 154(b) by 420 days.

(21) Appl. No.: 14/669,920

(22) Filed: Mar. 26, 2015

(65) Prior Publication Data

US 2015/0276552 A1    Oct. 1, 2015

Related U.S. Application Data

(60) Provisional application No. 61/971,018, filed on Mar. 27, 2014.

(51) Int. Cl.
| | | |
|---|---|---|
| G01M 15/10 | (2006.01) | |
| F01N 11/00 | (2006.01) | |
| G01M 3/02 | (2006.01) | |

(52) U.S. Cl.
CPC ............. *F01N 11/00* (2013.01); *G01M 3/025* (2013.01); *G01M 15/106* (2013.01); *Y02T 10/47* (2013.01)

(58) Field of Classification Search
USPC .............................. 73/114.69, 114.71, 114.76
See application file for complete search history.

(56) References Cited

U.S. PATENT DOCUMENTS

| | | | | |
|---|---|---|---|---|
| 3,603,155 | A * | 9/1971 | Morris ................. | G01M 15/102 55/DIG. 30 |
| 4,550,751 | A * | 11/1985 | Shimamura ............. | B63B 13/02 114/125 |
| 5,756,360 | A * | 5/1998 | Harvey ................. | G01N 1/2252 422/83 |
| 6,112,574 | A * | 9/2000 | Hirano .................... | G01F 1/704 73/23.31 |
| 6,200,819 | B1 * | 3/2001 | Harvey ................. | G01N 1/2252 422/83 |
| 6,318,155 | B1 * | 11/2001 | Carr ........................ | F01P 11/18 73/49.7 |
| 6,460,400 | B1 * | 10/2002 | Ichikawa ................ | G01F 1/363 73/114.71 |
| 9,417,153 | B2 * | 8/2016 | Parker ..................... | G01M 3/20 |
| 2009/0084200 | A1 * | 4/2009 | Takahashi ............ | G01N 1/2252 73/864.73 |
| 2011/0099983 | A1 * | 5/2011 | Ohno .................... | F01N 3/2066 60/277 |
| 2012/0017666 | A1 * | 1/2012 | Otsuki ............... | G01N 33/0026 73/23.33 |
| 2012/0266687 | A1 * | 10/2012 | Takahashi ............ | G01N 1/2252 73/861 |
| 2014/0083168 | A1 * | 3/2014 | Parker ................... | G01M 3/022 73/40.7 |
| 2014/0216132 | A1 * | 8/2014 | Asami .................. | G01N 1/2252 73/23.31 |
| 2017/0322102 | A9 * | 11/2017 | Parker ................... | G01M 3/022 |

* cited by examiner

*Primary Examiner* — Eric S McCall
(74) *Attorney, Agent, or Firm* — Birch, Stewart, Kolasch & Birch, LLP

(57) ABSTRACT

A system and method are provided for testing and verification of an exhaust system. The system and method introduce a low pressure flow of gas into the exhaust system through an adaptor that fits into or about an exhaust pipe of the exhaust system. The low pressure gas can then be used, in the absence of engine noise, heat, and/or dangerous exhaust gases, to determine if one or more leaks exist in the exhaust system.

10 Claims, 9 Drawing Sheets

EXHAUST SYSTEM INTEGRITY TESTER

This application claims the benefit of provisional application 61/971,018, filed Mar. 27, 2014.

TECHNICAL FIELD

The embodiments discussed herein are related generally to the field of auto repair, and more particularly to the maintenance of automotive exhaust systems.

BACKGROUND

It is well understood that in regard to today's economy, as well as in regard to environmental concerns, minimizing exhaust emissions, especially in internal combustion engines in automobiles, is critical. Many, if not all states in the U.S. have laws that regulate the amount of exhaust emissions that are allowed to be released into the atmosphere. These laws have led to significantly reducing the amounts of carbon monoxide, hydrocarbons, oxides of nitrogen, and other pollutants that have been released into the atmosphere on a per-automobile basis since the 1960's, when rising environmental awareness lead to the passing of the exhaust monitoring laws. Some states have also enacted statewide vehicle safety inspections which require the vehicle exhaust systems to be in sound condition with no major defects or leaks from any of the components. Consequently, automobile owners have a vested interest in keeping their cars maintained for peak performance. Failing an emissions control test, or any other safety inspection, means that the car owner must get the car repaired within a reasonable period of time, or potentially face fines and/or loss of vehicle registration. Further, it is well known that for most vehicles, a well maintained and well-tuned engine that produces small amounts of exhaust emissions maximizes performance including, among other factors, fuel economy. Fuel economy or lack thereof, is also a very important factor in automobile ownership for at least the past 30-40 years.

There are at least several reasons to maintain the integrity of the exhaust system. Exhaust system integrity is important to properly maintain catalytic converter efficiency, as well as the safety aspect to deliver the harmful exhaust gases rearward of the passenger compartment. Gaseous pollutants can be inadvertently released into the atmosphere if exhaust integrity is compromised. Reduced exhaust system pressure, i.e., reduced "back pressure," can decrease the efficient operation of the automobile emission control system by not allowing certain types of emission controlling devices to operate, as well as allowing monitored gases to escape into the atmosphere before being converted by the catalytic converter Further, releasing pollutants prior to, or even after the catalytic converter, as a result of exhaust leaks, can have significant consequences, such as carbon monoxide poisoning of the driver and/or occupants of the vehicle.

Thus, there has developed over time the need to maintain the integrity of exhaust systems of internal combustion vehicles, and a means to verify the integrity of the exhaust system.

FIG. 1 illustrates a typical internal combustion engine 110 and exhaust system 125 that are commonly used by automobiles (autos) today (while reference is made to an auto, those of skill in the art can appreciate that this is merely one example of use by a device of an internal combustion engine, and many other devices utilize an exhaust system (e.g., construction equipment, forklifts, trucks, railroad and aircraft engines, among others, but in fulfillment of the dual purposes of clarity and brevity, discussion of any of the other examples has been omitted). As those of ordinary skill in the art can readily appreciate, FIG. 1 is a greatly simplified illustration. Engine 110 includes intake manifold 106, located on engine block 102, and to which is attached a means for introducing fuel (commonly gasoline, but which can include any other fuel such as propane, hydrogen, diesel, natural gas, among others) and air into engine 110 for combustion. The means for introducing fuel commonly used today includes fuel injection systems and carburetors 104. Fan 108, along with a radiator (not shown) provides means for cooling engine 110, and can also be considered part of engine assembly 110.

Following introduction of the fuel and air mixture, and internal combustion thereof, extremely hot exhaust gases 124 are emitted from engine 110 via exhaust manifold 112, and exhaust manifold pipe 114. Exhaust system 125 includes exhaust manifold 112, exhaust manifold pipe 114, catalytic converter 116, linking exhaust pipe 118, muffler 120, and exhaust pipe 122. This is a very generic picture, as many exhaust configurations can include two manifold pipes 114a,b, two mufflers 120a,b, two exhaust pipes 122a,b, among other differences. Further, it is possible that other exhaust configurations can omit a catalytic converter 116 and/or muffler 120. Exhaust gases 124 flow through exhaust manifold pipe 114 into catalytic converter 116, and then into linking exhaust pipe 118, which connects the output of catalytic converter 116 to the input of muffler 120. Attached to the output of muffler 120 is exhaust pipe 122, which is what is commonly seen protruding from the rear of autos. Exhaust gas 124 is released into the atmosphere from exhaust pipe 122.

As those of skill in the art can appreciate, in some configurations, exhaust manifold 112 can incorporate the catalyst in place of, or in addition to, it being part of catalytic converter 116. This is but one such example of the numerous variations that can exist in the design and manufacture of exhaust reduction devices. As such, the figures are not meant to be limiting, but only describe in a general fashion so as to render the embodiments easier to understand; those of skill in the art can appreciate that variations from manufacturer to manufacturer exist, and are all are considered to be within the scope of the embodiments discussed herein. As will be apparent, the invention can be used with any exhaust system Sources of leaks can commonly occur at the joints between exhaust system components, and along rusted or cracked sections of exhaust pipe(s) 122 and/or muffler(s) 120. For example, when installing exhaust manifold pipe 114 onto exhaust manifold 112, each cylinder of engine 110 typically has its own exit point into exhaust manifold 112. Even on turbo-charged engines there are many connection points for exiting exhaust gasses, all of which require system integrity. Gaskets or machined clearances that allow metal-to-metal fit without the use of sealing gaskets can also be a source of exhaust gas leaks. In short, any means for inadvertent leakage of gases can be determined by exhaust system verification tester 300, as described in greater detail below.

As shown in FIG. 1, exhaust manifold 112 has four separate tubes that extend from a main portion and that are attached to exhaust pipe 114, typically with bolts/studs and machine thread nuts, and heat resistant and pressure resistant gaskets. Over time, these gaskets can degrade and fail, and become a well-known source of leaks of exhaust gas 124. These gaskets are typically used between each of the main components of exhaust system 125. For example, gaskets can be used between exhaust pipe 114 and catalytic converter 116, between catalytic converter 116 and linking exhaust pipe 118, and so on. On a typical internal combustion, or more generally, combustion vehicle there is a combination of bolted connections that contain gaskets, metal-to-metal flanges, and "slip fit" overlapping connections that require U-shaped exhaust claps (U-bolt clamps). Still further, due to very low clearances on some automobiles, and rather intricate undercarriage designs, each exhaust pipe itself can have several components, each of which may need to be joined together, again through use of the heat resistant and pressure resistant gaskets or U-bolt type clamps. For example, exhaust manifold pipe 114 can have two or even three separate components, each of which would need to be joined together with nuts and bolts, and the heat and pressure resistant gaskets.

Another source of leaks in exhaust system 125 is the metal pipes themselves. Over time, because the metal is exposed to very high temperatures, corrosive exhaust gases 124 and external chemicals such as oxygen, road salt (e.g., NaCl, CaCl, and MgCl), among others, exhaust system pipes 118, 122 will begin to rust and leaks will occur. On occasion, because of the intricate exhaust system design, the leaks can occur in areas that are not at all visible and can only be determined by feeling or listening for an exhaust gas leak. As those of skill in the art can appreciate, and discussed in greater detail below, feeling and/or listening for very hot exhaust gases is at least often less than pleasant, and can be at times dangerous.

FIG. 2 illustrates a typical automotive repair shop exhaust system verification or testing setup. Most, if not all, auto repair service centers and emission testing centers perform some sort of exhaust verification service. Exhaust verification service involves checking the integrity of exhaust system 125 in order to determine if there are any leaks, and if so, where the leaks are located. Leaks in an exhaust system, as discussed above, can lead to poor or lowered performance, failed emissions tests, and/or dangerous conditions wherein carbon monoxide and/or other pollutants produced by internal combustion engines can find their way into the passenger compartment of auto 200. The latter situation can have dramatic consequences, even leading up to death by carbon monoxide poisoning or accidents due to drivers impaired from carbon monoxide poisoning.

As shown in FIG. 2, auto repair shops will put auto 200 onto lift 204, or drive over a pit to access the undercarriage and mechanic 206 will start engine 110, while putting an exhaust gas tube 208 over exhaust pipe 122 to route exhaust gases 124 directly outside or through an exhaust gas evacuation system (not shown), so that dangerous levels of carbon monoxide and/or other pollutants do not build up in the service area. Exhaust gases 124 are then released in the atmosphere.

The mechanic 206 then tests exhaust system 125 of auto 200. The mechanic 206 will generally visually inspect exhaust system 125, looking for obvious leaks, as exhaust leaks can have a distinctive sound or smell, but sometimes exhaust gases 124 are colorless. In the latter case, mechanic 206 has no other choice than to listen carefully over the length of exhaust system 125 for leaks. Typically, a leak will manifest itself as a low rumble that must be heard over the sound of engine 110, as well as other shop noises which can be a very noisy environment. As those of ordinary skill in the art can further appreciate, exhaust systems 125 are typically "capped" off by hand during examination. As those of skill in the art can appreciate, "capping" exhaust system 125 means putting some obstruction in the end of the tail pipe by mechanic 206, and listening for leaks. If exhaust system 125 were capped on a weak but functional exhaust system, engine assembly 110 could build enough pressure to blow out a weak connection on muffler 120 or pipe(s) 118, 122. Or, in the process of capping exhaust pipe 122, mechanic 206 could be exposed to dangerously hot components and gases 124, and can be burned. Therefore, a low pressure "exhaust integrity" tester according to embodiments is needed.

But, even if no noises are heard, as is sometimes the case, mechanic 206 must then make what is referred to as a hand inspection. That is, mechanic 206 runs his hands over portions of exhaust system 125, especially the parts that cannot be seen, or which are very close to the noisy engine 110, and feel for a leak from exhaust system 125. Another method for determining the integrity of exhaust system's 125 components is to squeeze exhaust pipes 118, 122, usually with pliers, wrenches, or other tools. However, this practice has recently come under increased scrutiny. Increasing numbers of states and/or other jurisdictions are introducing legislation that does not allow the practice of squeezing an exhaust pipe with a large pair of pliers in an attempt to check the integrity of exhaust system components. It is alleged that the practice of squeezing exhaust system components can lead to collapsed pipes and/or exhaust system or other system's components and sometimes can create a new leak or may enlarge an existing leak.

In common practice, mechanic 206 will have an assistant put their hand over exhaust pipe 122 while the engine is running so that leaks of exhaust gases 124 can be located. This practice also requires internal combustion engine 110 to be running while the test is performed and therefore spews exhaust gases 124 into the air the whole time auto 200 is lifted in the air, a process known by those of skill in the art as a "running engine leak test." Additionally, this practice not only jeopardizes the safety of the assistant but also puts mechanic 206 at risk for severe burns due to hot exhaust gases 124 and endangers mechanic 206 due to having his or her hands near moving components of a hot and running engine 110. Exhaust gases 124 are very hot, typically between 500° F. and 2000° F. with pipe temperatures near the engine in excess of 600° F., and as such, mechanic 206 must exercise extreme care to avoid being burned. Depending on where the leak is encountered (e.g., near exhaust manifold 114) performing a running engine leak test is not possible. This means mechanics 206 generally do the manual inspection as quickly as possible. Less conscientious mechanics 206 will tend to "gloss" over this portion of the test, and the result can be false positives, meaning that leaks can go undetected. As can be easily imagined, this can lead to more expensive repairs later, or repeated trips to the same or different automotive repair shops to correct the situation, which of course wastes the time and money of the owner of auto 200 and shop owners/mechanics.

SUMMARY OF THE INVENTION

It is therefore an object of the invention to provide a system to test exhaust system integrity that will obviate or minimize problems of the type previously described.

According to a first aspect of the embodiments, a method for verifying the integrity of an exhaust system is provided comprising introducing pressurized gas into the orifice of the exhaust system, and verifying an operating integrity of the exhaust system based on a response by the exhaust system to the pressurized gas.

According to a second aspect of the embodiments, an exhaust system verification apparatus for verifying the integrity of an exhaust system is provided comprising a gas pump apparatus configured to introduce pressurized gas into an orifice of the exhaust system, a gas pressure detection apparatus configured to verify an operating integrity of the exhaust system based on a response of the exhaust system to the pressurized gas. According to the second aspect of the embodiments, the pressure detection apparatus is further configured to verify an operating integrity of the exhaust system when a first exhaust system gas pressure increases to a first predetermined test pressure, and wherein the pressure detection apparatus is further configured to determine the exhaust system does not exhibit operating integrity if the first exhaust system gas pressure does not increase to the first predetermined test pressure.

According to a third aspect of the embodiments, a method for verifying the integrity of an exhaust system is provided, the method comprising enabling a pressurized gas to flow into an orifice of the exhaust system by fitting an adaptor about an orifice of the exhaust system by selecting the adaptor to fluidly connect to and seal the orifice of the exhaust system, and fluidly connecting and sealing the orifice of the exhaust system with the adaptor that fits within the orifice, and introducing pressurized gas into the orifice of the exhaust system through the adaptor, measuring a first gas pressure of the first pressurized gas within the exhaust system; and verifying an operating integrity of the exhaust system by determining whether, during a first predetermined time period, the first gas pressure increases to a value at least about equal to the predetermined test pressure such that the exhaust system exhibits operating integrity, and further determining, during the first predetermined time period, the first gas pressure does not increase to the value at least about equal to the predetermined test pressure such that the exhaust system fails to exhibit operating integrity, continuing to introduce pressurized gas into the exhaust system through the adaptor at a second predetermined gas pressure if the first gas pressure does not increase to the value at least about equal to the predetermined test pressure, and determining whether, during a second predetermined time period, the first gas pressure increases to a value at least about equal to the second predetermined test pressure such that the exhaust system exhibits operating integrity, and further determining, during the second predetermined time period, whether the second pressure does not increase to the value at least about equal to the second predetermined test pressure such that the exhaust system fails to exhibit operating integrity.

BRIEF DESCRIPTION OF THE DRAWINGS

The above and other objects and features of the present general inventive concept will become apparent and more readily appreciated from the following description of the embodiments with reference to the following figures, wherein like reference numerals refer to like parts throughout the various figures unless otherwise specified, and wherein.

DETAILED DESCRIPTION

Figure 1:
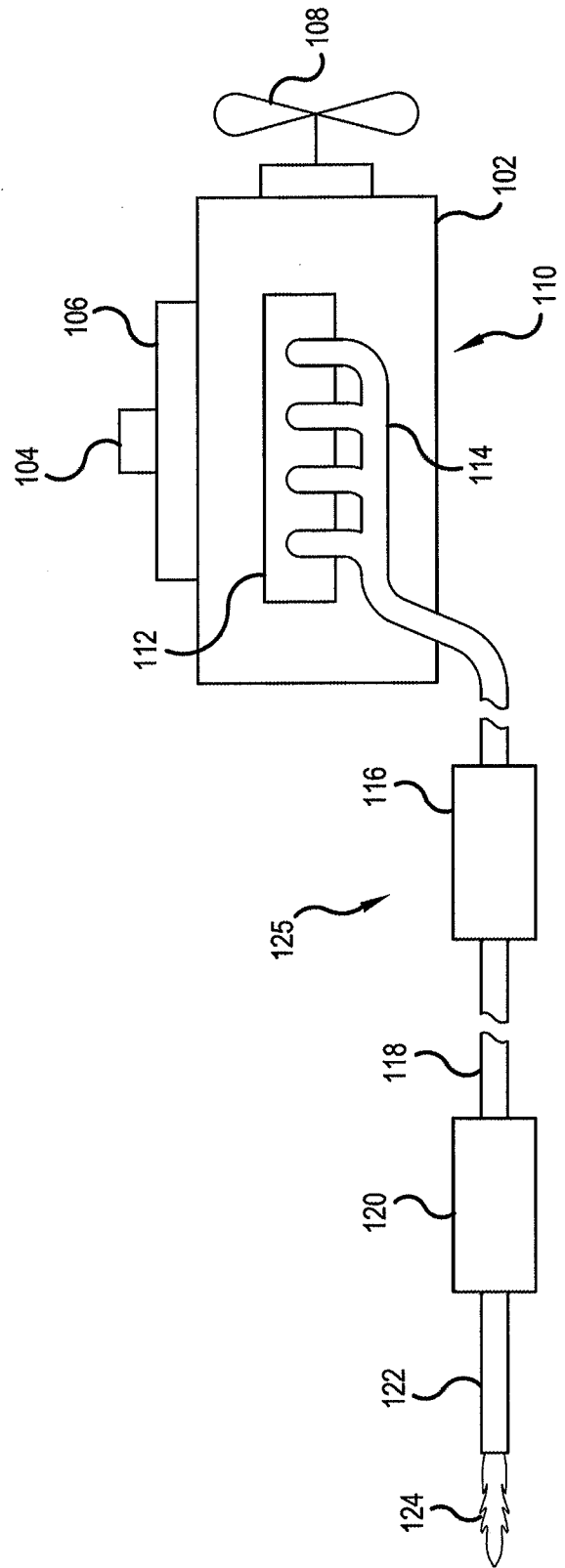
FIG. 1 illustrates a simplified diagram of an engine and exhaust system of the engine.
Figure 2:
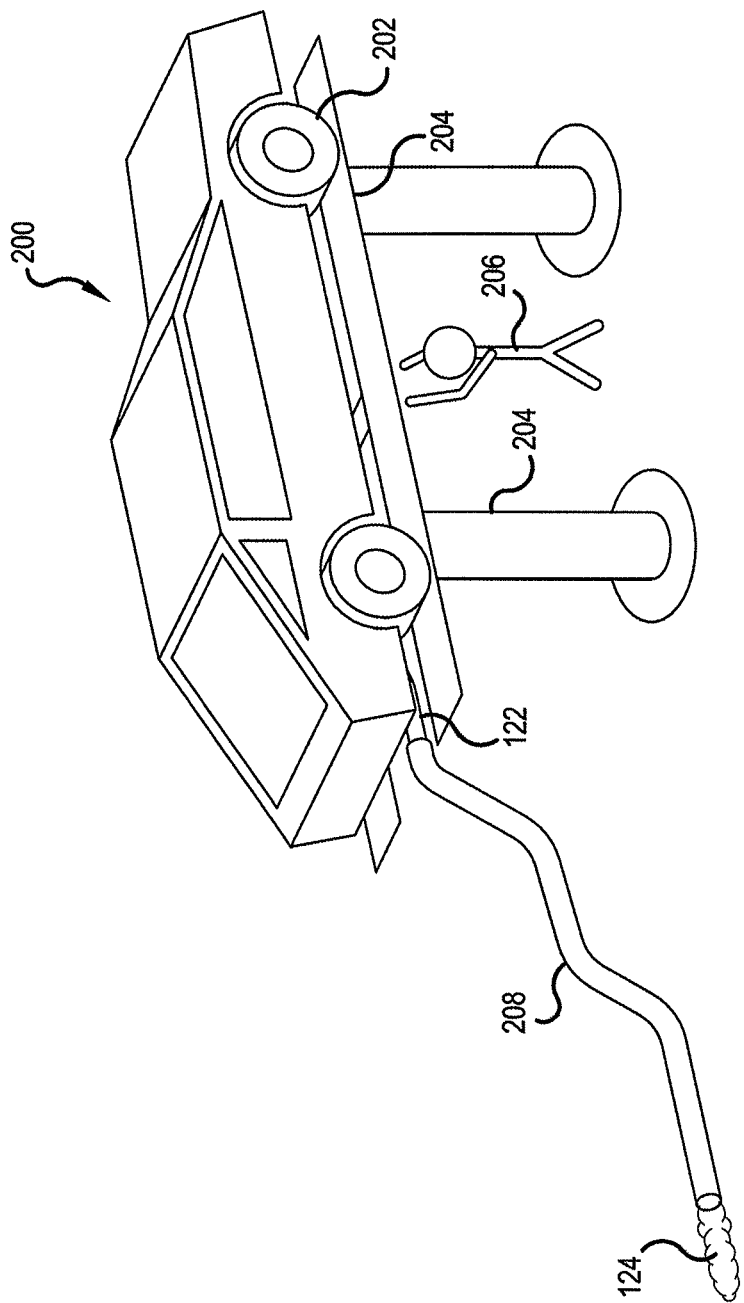
FIG. 2 illustrates a typical exhaust test system.

Various embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims.

Reference throughout the specification to "one embodiment" or "an embodiment" means that a particular feature, structure, or characteristic described in connection with an embodiment is included in at least one embodiment. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

Figure 3:
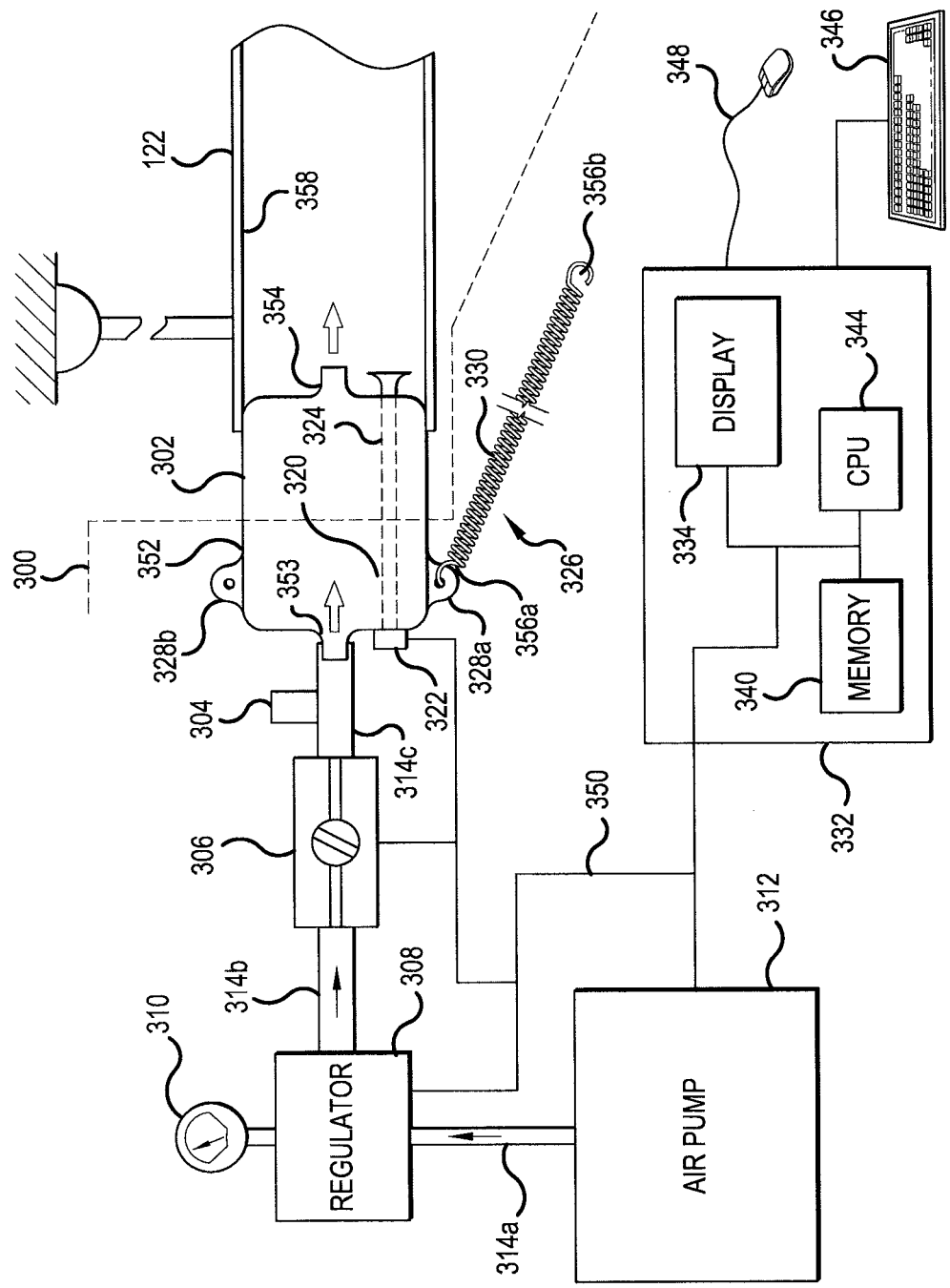
FIG. 3 illustrates an exhaust system verification device according to an embodiment.

FIG. 3 illustrates a block diagram of exhaust system integrity tester (ESIT) 300 according to an embodiment. ESIT 300 comprises air pump 312, first pressurized air hose 314a, regulator 308, second pressurized air hose 314b, open-shut valve (valve) 306, third pressurized air hose 314c, exhaust adaptor 302, adaptor input orifice (input orifice) 353, adaptor output orifice (output orifice) 354, pressure relief valve 304, restraining device 326, and computerized diagnostic test center 332. As those of skill in the art can appreciate, this list of components is neither totally inclusive nor exclusive, meaning, according to further embodiments, other components not shown could be used, and less components than what is shown in FIG. 3 can also be used to implement ESIT 300 according to embodiments. For example, air pump 312 can be replaced by a pressurized cylinder that contains pressurized air, or some other gas that can perform the same function. However, in fulfillment of the dual purposes of clarity and brevity, the discussion from hereon in will consider only that an air pump 312 will be used to deliver pressurized air, according to the descriptions that follow, but those of skill in the art can appreciate that the same should not be taken in a limiting manner.

Further shown in FIG. 3 is high-p air, generated by air pump 312, which in turn uses regulator 308 to generate low-p air according to an embodiment. Regulator 308 includes pressure gauge 310, which can be an analog pressure indicator, or a digital device, wherein air pressure is measured via an internal transducer, and converted into a digital signal, and a corresponding readout provided according to well-known means for such devices. Restraining device 326, discussed in greater detail below, comprises first and second hooks 356a, b, and chain 330. According to further embodiments, restraining device 326 can itself include additional or fewer components than what is shown in FIG. 3, and described in greater detail below, and still accomplish its intended function. Adaptor 302 includes, among other things, outer surface 352 and restraining device connectors 328a, b.

Computerized diagnostic test center (test center) 332 includes, among other components known to those of skill in the art, non-transitory code or software (stored in memory 340), a central processing unit (CPU) 344 to execute instructions that can be used to automate testing of auto 200 (e.g., method 700, described in greater detail below), as well as key board/input device 346, display 334 (which could be touch screen, eliminating the necessity of a keyboard 346), and optionally mouse 348 (again, the touch screen display and/or touch pad and/or "mouse stick" can be used in place of mouse 348). Test center 332 is discussed in greater detail below.

Also shown in FIG. 3 is a cut-away portion of auto 200, with exhaust pipe 122. Exhaust pipe 122 has an inner surface 358, and adaptor 302 has an outer surface 352. The air output from pump 312 is high pressure (high-p) air, and, as discussed in greater detail below, the air output from regulator 308 is low pressure (low-p) air.

Figure 4:
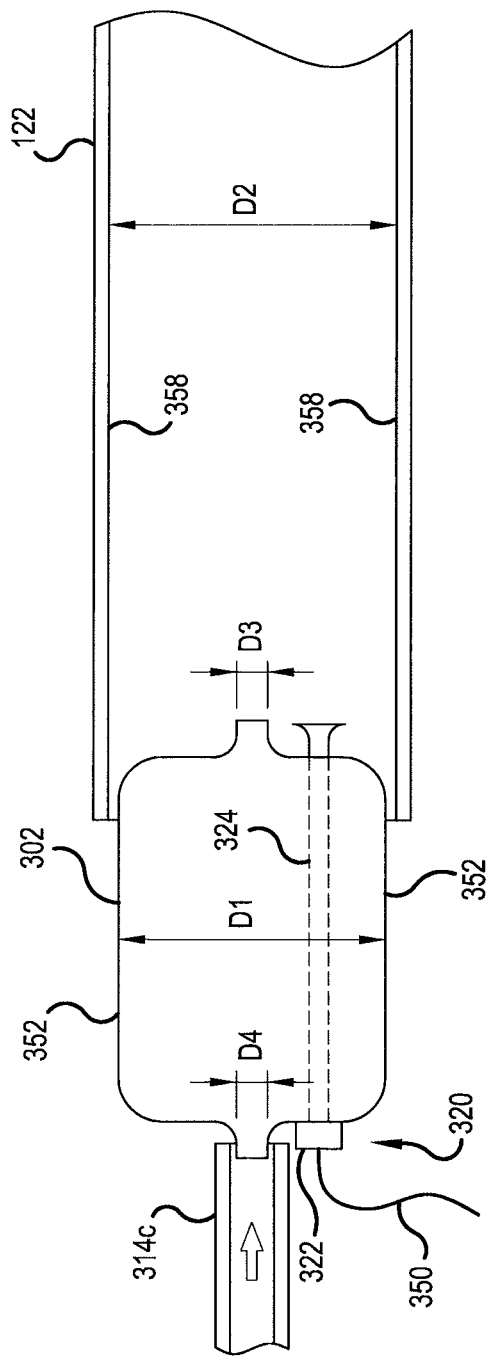
FIG. 4 illustrates a detailed view of an adaptor of the exhaust system verification tester shown in FIG. 3 being inserted into an exhaust pipe of an automobile under test.
Figure 5:
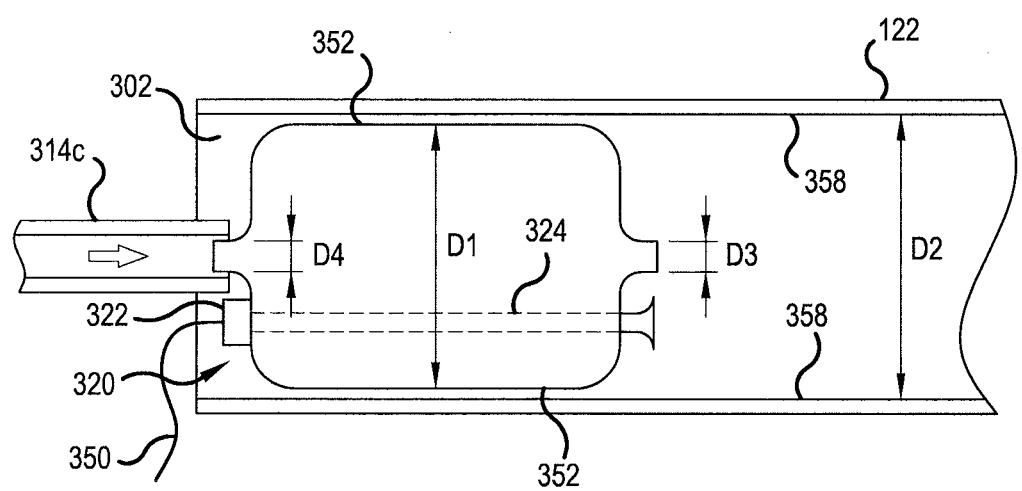
FIG. 5 illustrates a detailed view of the adaptor of the exhaust system verification tester shown in FIG. 3 following insertion into the exhaust pipe of the automobile under test and inflation with low pressure air.

To use ESIT 300, mechanic 206 selects and places adaptor 302 inside exhaust pipe 122. According to an embodiment, adaptor 302 is sized to fit within exhaust pipe 122. According to a further embodiment, as shown in FIG. 4, the outer diameter of adaptor 302, D1 is smaller than, or less than the inner diameter D2 of exhaust pipe 122 such that adaptor 302 fits snugly within exhaust pipe 122. According to an embodiment, the outer diameter D1 of adaptor 302 is such that when inflated, adaptor 302 inflates and forms a sufficiently tight enough seal between the outer surface 352 of adaptor 302 and the inner surface 358 of exhaust pipe 122 (as shown in FIG. 5) so that low pressure air cannot escape out of exhaust pipe 122 behind or around adaptor 302. That is, the outer diameter of adaptor 302 will be dependent upon the material adaptor 302 is made of, the thickness of the material (as inflation size is dependent on the material and thickness), and the inner diameter D2 of exhaust pipe 122, all which can vary. However, as known to those of skill in the art, most exhaust pipes 122 are of a standard size or at least a known size, and several different adaptors 302 of varying outer diameters should be able to test most exhaust systems 125 in the market.

Once adaptor 302 is located inside exhaust pipe 122, mechanic 206 starts, or connects air pump 312 to ESIT 300. High-p air is provided by air pump 312 through first air hose 314a to regulator 308. Regulator 308 monitors and reduces the air pressure from air pump 312 (the output from air pump 312 can also be referred to as "shop air," i.e., the air produced in auto repair shops from commercial grade air pumps to drive air-driven tools) from a first, high pressure air pressure to a second, lower air pressure, or low-p air. Thus, the air out of regulator 310 can be referred to as low pressure (low-p) air. According to an embodiment, the first, high pressure air pressure 316 is about 120 psi (this is a commonly used air pressure to run air-driven shop tools, such as impact wrenches, and the like). According to an embodiment, second air pressure (low-p air) is variable from about 1 psi to about 30 psi, according to a further embodiment, variable between about 10 psi to about 20 psi, and according to still a further embodiment, low-p air is about 15 psi. According to an embodiment, use of low air pressure provides good results in testing as well as ensuring the safety of components of exhaust system 125 and personnel using ESIT 300. According to a further embodiment, the pressure of low air pressure 318 can depend upon the size of adaptor 302, the material it is made of, and most critically, the exhaust system components. As those of skill in the art can appreciate, although ESIT 300 has been discussed and described thus far as using high and low pressure air as a detector for testing the operating integrity of exhaust system 125, the embodiments described herein should not be limited to the use of air; many other gases, especially inert gases, can be used in place of air.

As those of skill in the art can appreciate, air pressure that is too great should not be introduced into exhaust system 125 as this will or could cause any of the different exhaust system 125 components to fail. As discussed above, "capping" exhaust system 125 can also be detrimental to one or more of its components. For example, there are exhaust gas recirculation (EGR) transducers and other types of sensors that have a nominal pressure operating range of about 0.1 psi to about 3 psi. Introducing too much air pressure can, in some circumstances, over-stress the transducers, and cause them to fail. As those of skill in the art can appreciate, the pressure of exhaust gases 124 is generally considered to be low, usually less than about 1 psi, because of the restriction of catalytic converter 116 and muffler 120. As such, according to an embodiment, the testing air pressure of ESIT 300 is in the range of about 1.0 psi to about 15.0 psi. The air is supplied by an air pump, a common device in auto shops, adding to the utility of the ESIT 300. The air supplied by the air pump does not need any additives to provide a visual indication of leaks. Rather, the presence of leaks can be detected by the feel or sound of air escaping from a leak. For the purposes of the invention, the term "sufficient air pressure," when used in the context of the pressure supplied to the exhaust system, refers to an air pressure high enough to produce the tactile and audible feedback caused by air escaping from an exhaust system through a leak.

According to a further embodiment, ESIT 300 further includes safety valve 304 (also referred to as a "blow-off" valve) that can be set to about 15 psi (or any other suitable value of air pressure) to substantially prevent and/or minimize over-pressuring of exhaust system 125 and its components. Safety valve 304 can have its over-pressure setting set manually, or it could be an electro-mechanical device, whereupon it could be controlled automatically, or it could be manufactured pre-set to a pre-determined value, for example, about 15 psi.

According to still a further embodiment, ESIT 300 can include restraining device 326, which can be attached to restraining connector 328, which is part of adaptor 302. Restraining device 326 comprises first and second hooks 356a, b, and chain 330 (which can be, as those of skill in the art can appreciate, any flexible or semi-flexible or even rigid connecting apparatus (i.e., rope or wire). According to a further embodiment, hooks 356 can be any type of connecting apparatus that provides for quick and relatively easy connect and disconnect functionality, e.g., hook, pin, loop, among other devices). In operation, mechanic 206 connects either of first or second hooks 256a, b to restraining connector 328a, b (either or both, as shown in FIG. 3), and loops and secures chain 330 over or to some part of automobile 200 in the vicinity of adaptor 302 so as to provide a restraining force should adaptor 302 become loose and possibly be ejected from exhaust pipe 122 during an over-pressure situation. For example, chain 330 could be looped around a rear axle, the pipe being tested, or some bracket under automobile 200, and secured to itself via the other hook, 356b. Or, second hook 356b could itself be removably fixedly attached to a bracket or some other convenient apparatus suitable for providing a restraining force to ESIT 300 in the manner aforethe described.

According to a further embodiment, ESIT 300, test center 332 can ascertain whether retention restraining device 326 is properly connected. According to an embodiment, test center 332 can ascertain proper connection of restraining device 326 by an automated means, a confirmation means, or combination thereof. For example, test center 332 can, during set up and operation of a testing program, inquire to operator 206 as to whether restraining device 326 is properly connected. Or, during operation of the testing program, test center 332 can simply ascertain if connection is properly made based on a test electrical signal that can be applied to the connection device. Such testing signals (i.e., ground verification) are known to those of skill in the art, and need not be discussed in any great or further detail. Or, still further, testing center 332 and the testing program can inquire to operator 206 if restraining device is properly connected, and verify its own test signal, in order to possibly avoid a false positive (if, for some reason, testing program reads the test signal as indicating proper connection, but in fact restraining device has not been properly connected).

After verifying that the proper air pressure is available to test exhaust system 125, mechanic 206 then opens valve 306, allowing low-p air to enter adaptor 302, inflating it to fit snugly inside exhaust pipe 122. At the same time, low-p air leaves adaptor 302 through adaptor output orifice (output orifice) 354. The inner diameter D3 of output orifice 354 is sized to allow inflation of adaptor 302, and also to provide a passage for flow of low-p air into exhaust pipe 122 and the remainder of exhaust system 125 of auto 200. The flow of low-p air out of adaptor 302 through orifice 354 is such that it is restricted, allowing or forcing adaptor 302 to inflate. In order to create this restriction, D3 is less than or equal to D4. According to a further embodiment, any diameter D3 that is less than, but not equal to D4 will cause a restriction, such that adaptor 302 will inflate. However as those of ordinary skill in the art can appreciate, the smaller D3 is in relation to D4, the faster adaptor 302 will inflate, but it will take longer to fill exhaust system 125 with low-p air to discover possible leaks.

Low-p air enters into exhaust system 125 of auto 200 from output orifice 354 of adaptor 302 and pressurizes exhaust system 125, without having to turn on the engine 110 of auto 200. A mechanic 206 can now test the integrity of the exhaust system 125 without having to endure hot exhaust gases, and without any further extraneous engine noise or hand/digit endangerment from moving engine components. Instead of putting their hand over exhaust pipe 122, and having hot exhaust gases 124 to contend with, a mechanic 206 is feeling and listening for (with much less ambient noise) the high pitched whistle of cool, escaping air. A mechanic 206 can now make a complete inspection of exhaust system 125 with much less danger, in a much quieter environment, and therefore will naturally be able to make a more thorough inspection.

Figure 6:
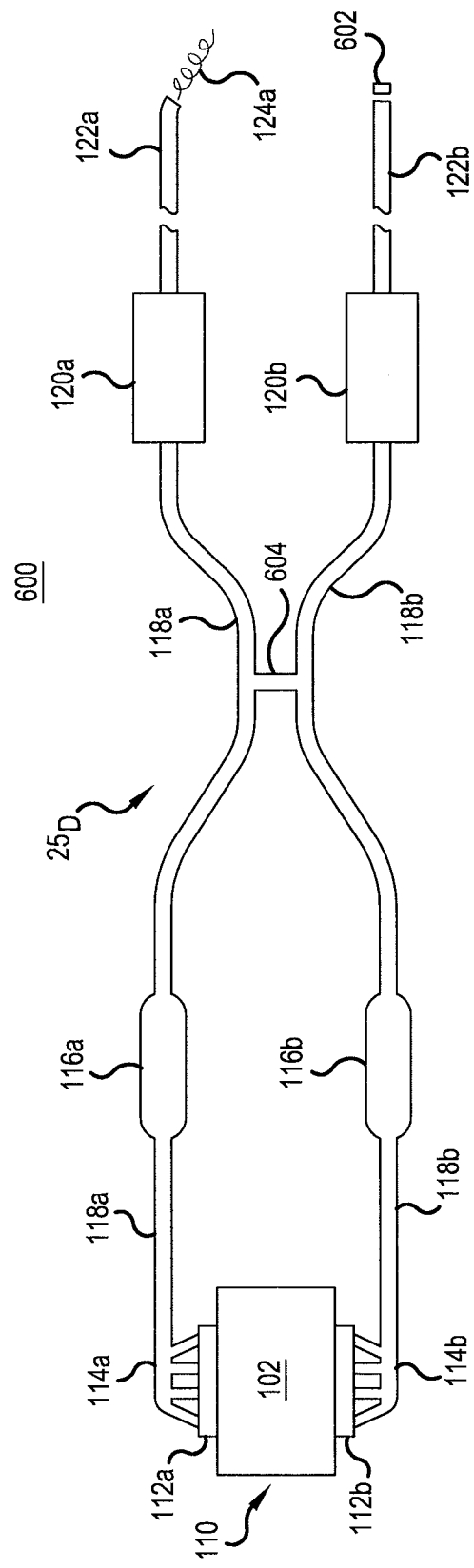
FIG. 6 illustrates a dual pipe exhaust system for use with exhaust system verification tester shown in FIG. 3.

FIG. 5 illustrates an inflated adaptor 302 inside exhaust pipe 122, with a substantially sufficient seal between the outer surface 352 of adaptor 302 and inner surface 358 of exhaust pipe 122 such that low-p air cannot substantially flow back out of exhaust system 125 and exhaust pipe 122. In addition, it is possible that auto 200 can have dual exhaust pipes 122a,b, as seen in FIG. 6. As shown in FIG. 6, dual exhaust system 600, which is substantially similar to exhaust system 125 as shown in FIG. 1, includes all of the same components with the exception of the addition of crossover pipe 604 between the two "separate" exhaust systems. Crossover pipe 604 exists to make sure that the pressure is substantially equalized between the components in both exhaust systems. Use of ESIT 300 would not only include the apparatus as discussed above in regard to FIGS. 3-5, but also exhaust cap (cap) 602 to cap one of exhaust pipes 122a,b. Since crossover pipe 604 allows exhaust gases to flow freely between all of the components, it will also allow low-p air to move freely, and thus only one cap 602 is needed to test dual exhaust system 600 using ESIT 300. However, in some cases, crossover pipe 604 is not present, and those cases each of the sub-exhaust system assemblies would have to be tested separately, possibly without the need for cap 602.

According to a further embodiment, a means for detecting pressure internal to exhaust system 125 is provided to help prevent over-pressure situations that have been discussed above as possibly being detrimental to the components of exhaust system 125. Over-pressure detection sub-system (OPDS) 320 can operate autonomously, with test center 332, and use of software, or "manually" i.e., there is no computer interface, or a combination of the two. In operation, OPDS 320 monitors the internal pressure of air interior to exhaust system 125, and alarms when an over pressure situation arises. OPDS 320 can also facilitate testing by reporting back the pressure levels of low-p air interior to exhaust system 125 to test center 332, wherein the testing program can monitor it, and adjust air pump 312, regulator 310, and/or valve 306 as necessary. A detailed discussion of such feedback and control software and methodology are both not needed to aid in understanding the embodiments discussed herein, and also beyond the scope of the discussion. Therefore, in fulfillment of the dual purposes of clarity and brevity, such detailed discussion has been omitted.

According to an embodiment, OPDS 320 operates in the following manner. Internal pressure of exhaust system 125 is detected by any suitable means, such as a transducer 322, via sampling tube 324. As can be seen from FIGS. 3-5, sampling tube 324 is connected to transducer 322 and extends through adaptor 302 to the interior of exhaust pipe 122. Transducer detection devices are well known to those of skill in the art. According to a first embodiment, transducer 322 provides either an analog signal or a digital signal to test center 332 via external bus 350, where, if it is an analog signal, it can be converted to a digital signal by an analog-to-digital converter, or if it is digital, it can be simply input and processed by software accordingly. According to a further embodiment, an analog or digital pressure display means (similar to gauge 310) can be provided at or near OPDS 320, to provide a nearly instantaneous readout of the internal pressure of exhaust system 125 during test, or, the pressure display can be digital. According to a further embodiment, audio and visual warning indicators can be set and provided in the case of over-pressure situations (which can be pre-set by a user), or when such an over-pressure situation is about to occur.

During test of exhaust system 125, test center 332 and software will monitor the internal air pressure of low-p air as it enters exhaust system 125. If no pressure build-up is detected, presuming an automated testing scenario, program will indicate that no pressure is building up, though it should be, and provide an indicator (audio, visual, or both) to the user/operator 206, and this would indicate that one or more components are either not connected properly, not working properly, or perhaps adaptor 302 is not inserted into exhaust pipe 122 properly. Or, in the case of dual exhaust system 600, cap 602 has not been inserted properly or at all.

Once operator 206 has checked the integrity and placement of components of ESIT 300, testing can resume, according to program, and method 700, discussed in greater detail below. If, during testing, an over-pressure situation occurs, i.e., low-p air exceeds a pre-determined threshold air pressure (according to an embodiment, set to about 15 psi), program/method 700 again provides an audio/visual or both indicator to user/operator 206, and testing can be manually and/or automatically shut down. According to an embodiment, OPDS 320 can prevent, or substantially prevent damage to components of exhaust system 125, and facilitate proper testing of exhaust system 125.

According to still a further embodiment, OPDS 320 can assist in improving operation of ESIT 300 by collecting and forwarding data to test center 332 in regard to internal pressure values of different exhaust systems 125, and by correlating those internal pressures and determined failure causes, assist in creating a database. Such database could correlate internal pressure values with known, or probably known failure modes. Such tabulation and cross-correlation methods of conditions and failure modes are well known to those of skill in the art, are beyond the scope of this discussion, and hence will not be discussed in further detail in fulfillment of the dual purposes of clarity and brevity.

According to a further embodiment, ESIT 300 can be fully or partially automated. That is, a computer, processor, or other electronic device(s), i.e., computerized diagnostic test center (test center) 332 can be used to make testing more automated. According to this embodiment, a table of different autos 200 and exhaust pipe 122 sizes can be maintained by a program within test center 332, on an internal memory and can tell user/operator 206 which one of several adaptors 302 to use with ESIT 300. Once the correct adaptor 302 has been installed onto the end of air hose 314c (which can be fitted with a quick-disconnect fitting), user/operator 206 inserts adaptor 302 into exhaust pipe 122, and allows a dedicated program to begin testing with a push of a button or other manner of interface with a test/diagnostic program. Verification begins by automated means. A very low pressure air flow of low-p air expands adaptor 302 to seal exhaust system 125. After adaptor 302 is properly inflated (confirmed visually), exhaust system 125 integrity testing commences. If no flaws exist (i.e., there are no leaks), pressure will build quickly, which is reported to the operator via transducer 322 and OPDS 320. If, however, there are flaws, meaning there are leaks, the flow of low-p air is sustained without a commensurate pressure build up in exhaust system 125, and ESIT 300 can increase the air flow from pressure P1 to a higher pressure P2. The higher pressure P2 provides a better chance for the operator to find a leak, yet still remain within margins of safe operating/testing pressures for exhaust system 125.

Computerized diagnostic test center 332, which can control any one of air pump 316, regulator 308, valve 306 via command/data bus 350, directs high-p air to flow from air pump 312 through regulator 308, and controls regulator 308 to set the correct low-p air into adaptor 302. Test center 332 opens valve 306 allowing low-p air, at a first low air pressure, P 1, to flow into exhaust system 125 of auto 200 through adaptor 302. Test center 332 then monitors the air pressure in regulator 308 while user/operator 206 performs the diagnostic check of exhaust system 125 of auto 200 (visual/audio inspection). According to further embodiments, different air pressures can be used with different exhaust systems 125 of different autos 200 to maximize the efficiency of testing. That is, a first low-p air of 18 psi might work best with a first make of first auto 200a, and a second low-p air of 10 psi might work best with a second make of auto 200b. Test center 332 can increase or decrease low-p air by controlling the output of regulator 308 and/or air pump 312, thereby increasing or decreasing the pressure of low-p air into line 314b. Display 334 can provide a visual indication of the different air pressures, and also provide auditory indications if certain situations arise that might require immediate attention. Mouse 348 can be used to access different testing programs or scenarios and options available to user/operator 206, or key board/input device 346 can alternatively be used alone, or in conjunction with mouse 348, to operate test center 332. While various components of ESIT 300 can be automated, it is or should be apparent that only a certified, trained mechanic should make the manual inspection of exhaust system 125. Input devices 346, 348 and display 334 can be combined, as known to those of skill in the art, in a touchscreen type display.

Figure 7:
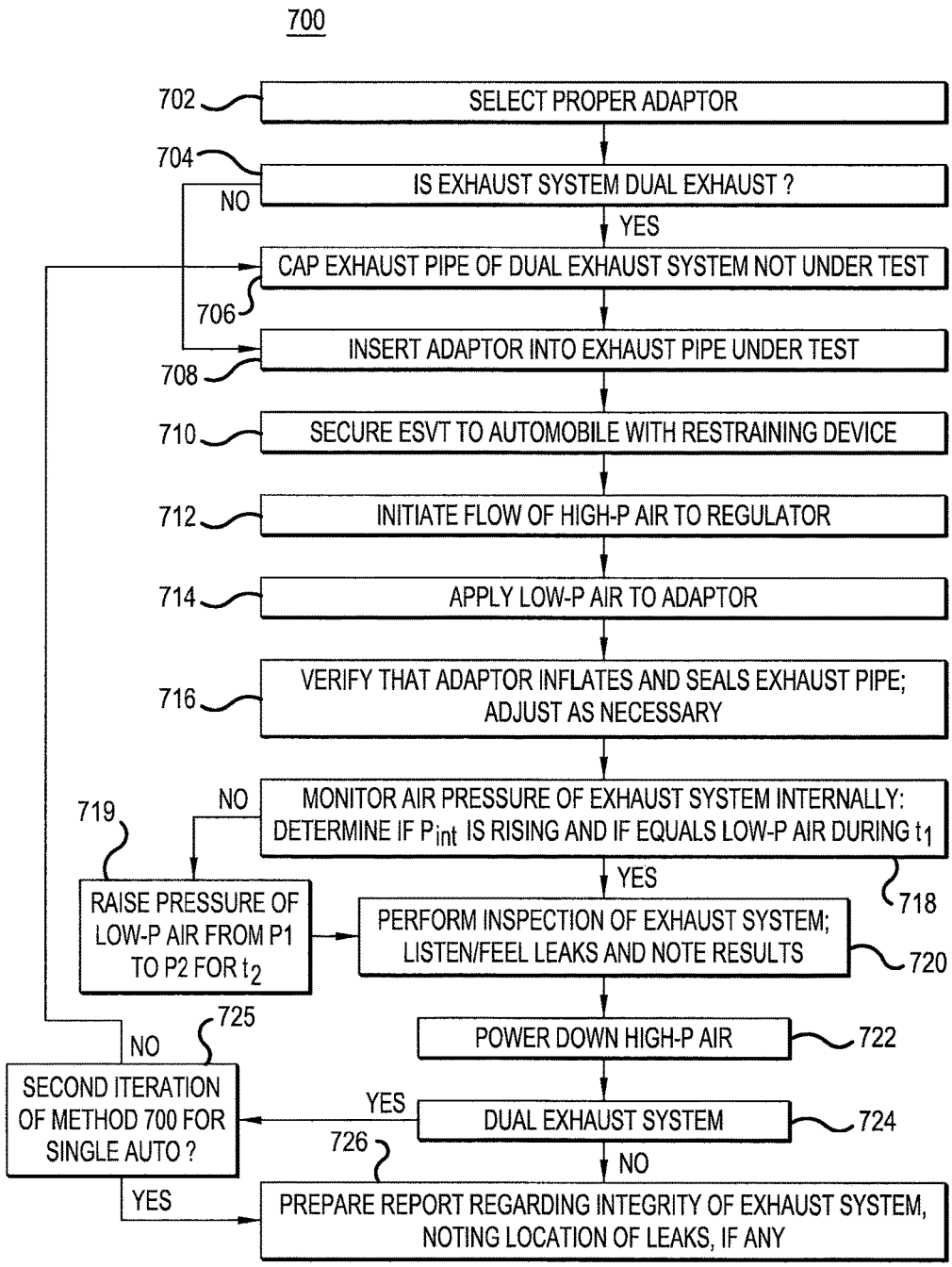
FIG. 7 illustrates a flow chart of a method of using the exhaust system verification tester shown in FIG. 3.

FIG. 7 illustrates a flow chart of method 700 for testing exhaust system 125 of auto 200. As discussed above, portions of method 700 can be automated, and during discussion of method 700 alternatives to manual testing will be discussed as necessary. As those of skill in the art can appreciate, testing of exhaust system 125, with or without test center 332, can be accomplished with ESIT 300 and method 700 is provided as simply one example of an embodiment of how testing can be conducted, but not necessarily as it needs to conducted. Those of skill in the art can appreciate that method 700, written in the form of a flow chart, for the convenience of the reader, and to ease understanding of the embodiments, includes operations, manual or automated, that may or may not need to be performed, whether in the particular order shown or at all. Further, those of skill in the art can appreciate that as a general guideline, therefore, the depiction of use of ESIT 300 via method 700 is but one embodiment, and should therefore not be taken in a limiting sense, as different permutations, discussed and described in detail herein, and as embodied in the claims, can occur.

Method 700 begins with step 702 wherein the proper adaptor 302 is selected for the particular type of auto 200. In decision step 704 it is determined whether or not automobile 200 is a dual exhaust type auto 200; if yes, method 700 proceed to step 706 wherein cap 602 is inserted into the exhaust pipe 122 that is not under test, and then proceeds to step 708, to insert adaptor 302 into the exhaust pipe 122 under test. If auto 200 is not a dual exhaust type ("No" path from decision step 704), method 700 proceeds to step 708, to insert adaptor 302 into the exhaust pipe 122 under test.

In step 710, user/operator 206 secures ESIT 300 to auto 200 with restraining device 326, as discussed above in greater detail. In step 712, the flow of high-p air commences to regulator 308. Operator 206 of method 700 verifies that adaptor 302 is properly fitted into, or adapted to, exhaust pipe 122, and then applies low-p air to adaptor 302. In step 714, method 700 and ESIT 300 opens valve 306 (if not already open) and low-p air flows into adaptor 302. In method step 716 Operator 206 verifies that adaptor 302 is inflating and sealing exhaust pipe 122 as desired.

In step 718, ESIT 300 monitors the internal air pressure of exhaust system 125, $P_{int}$ to verify that it is both rising and does not exceed preset air pressure threshold P1; according to an embodiment, P1 is set to the pressure of low-p air, which is about 15 psi. ESIT 300 monitors $P_{int}$ for a first time period, t1, which gives operator 206 enough time to perform a visual and manual inspection of exhaust system 125 (step 720). Should $P_{int}$ rise to the pressure of P1, it adds enough air at that point to maintain that pressure, while operator 206 performs the inspection. If, however, $P_{int}$ either does not rise at all or fails to achieve P1 in the first time period t1 ("No" path from decision step 718), then ESIT 300/method 700 proceeds, according to an embodiment, to step 719, and increases the pressure of low-p air from about P1 to about P 2. Then, ESIT 300 monitors Pint again, to determine whether the increased air pressure of low-p air will cause a corresponding rise of Pint, and allows a time period of t2 for this to occur. If $P_{int}$ does rise to P2, method 700 causes ESIT 300 to add just enough air to maintain P2, while operator 206 completes the inspection. Of course, as those of skill in the art can appreciate, visual and audio indicators can tell operator 206 exactly what is transpiring; for example, a first tone or beep could indicate the beginning of the flow of low-p air, while a second beep or several beeps indicates the end of t1 and beginning of t2, if needed. Following, or during step 719, method 700 proceeds or continues with step 720, wherein operator 206 performs the manual inspection.

As discussed above, in steps 719/720, method 700 and ESIT 300 monitors the elapsed time, and once either t1 or t2 expires, depending on whether a second higher internal air pressure was input to exhaust system 125. Following the lapsing of either or both of times t1 and t2, method 700 then proceeds to step 722 and shuts down high-p air with controls over pump 312, and/or regulator 308. Alternatively, ESIT 300/method 700 can shut off low-p air using valve 306 (e.g., in the case of a dual exhaust system auto 200, or if multiple cars are being tested, or if an option has been implemented to perform multiple testing of the same auto 200). These options are shown in FIG. 7 and method 700 in steps 724, 725.

Figure 8:
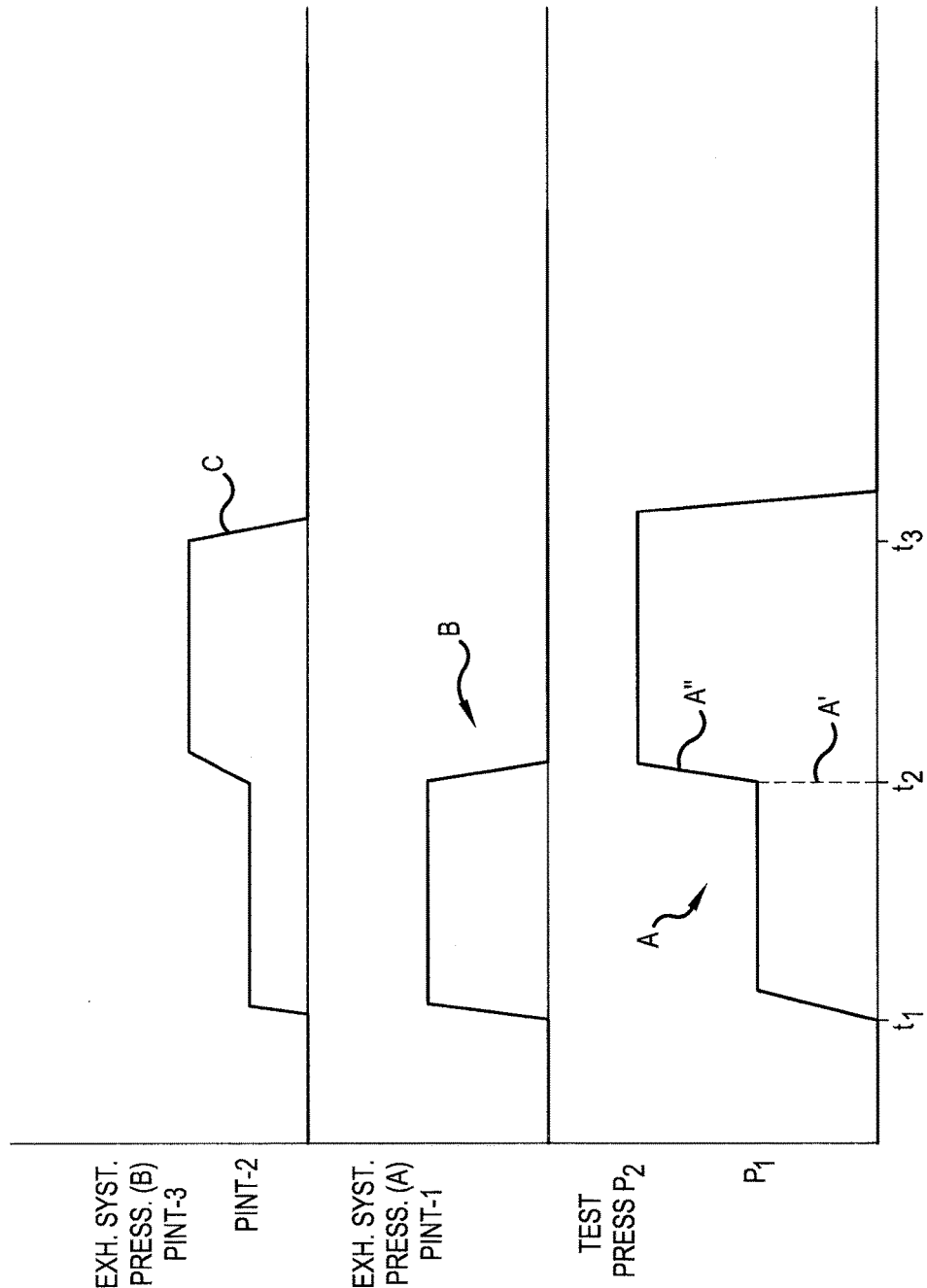
FIG. 8 illustrates a graph of pressure versus time for low pressure air applied to an exhaust system according to an embodiment.

FIG. 8 illustrates pressure versus time for both high and low pressure air as applied to exhaust system 125 through use of ESIT 300 according to an embodiment. Line A in FIG. 8 illustrates low-p air versus time, from the time of application to regulator 308 at time t1, to the end of test, at time t3; during this time period, from t1 to t3, it is presumed, for purposes of illustration only, that exhaust system 125 has failed to exhibit operating integrity during a first portion of the test, and as described above, a second, higher pressure, P2, which causes more air flow, is applied for a second predetermined time period (t2 to t3), in order to ascertain the extent of the problem with exhaust system 25

At time t1, high-p air is supplied by pump 312 to regulator 308, and is output as low-p air, as shown as line A in FIG. 8. Thus, low-p air as shown in FIG. 8 as line A is provided to ESIT 300 and adaptor 302. In a properly working exhaust system 125, $P_{int}$, the internal air pressure of exhaust system 125, would soon build to about the same pressure as low-p air, and this scenario is shown as line B of FIG. 8. At the end of the first predetermined period of time for testing exhaust system 125, ESIT 300 and/or operator 206 have determined that exhaust system 125 is working properly, and the test ends. High-p air is discontinued (presuming a single exhaust system only), and low-p air also stops (and drops to substantially zero psi), which is shown as line A' in FIG. 8.

If, however, exhaust system 125 does not exhibit proper operating integrity, then line C of FIG. 8 can result. High-p air is generated as before, producing low-p air shown as a first solid line portion of line A, for a time period from t1 to t2, but, $P_{int2}$ only rises to a fraction (or not at all), of low-p air's 318 pressure value. That is, $P_{int2} < P1$ (or low-p air) from t1 to t2. At time t2, ESIT 300 (and/or operator 206 and/or method 700), causes low-p air to rise to P2, as shown as the portion of line A in FIG. 8 (portion A"). This should cause a corresponding rise in pressure inside exhaust system 125 if it only has a small leak. Or, if the leak is large, and too much air escapes exhaust system 125, $P_{int3}$ may not rise at all and can be the same as $P_{int2}$, which could be a zero value, or some non-zero value, or about a zero value. In any case, if $P_{int3}$ is less than P2, i.e., low-p air (at its second, higher value), then exhaust system 125 has indicated a problem, and operator 206 should be able to find the one or more leaks during one or both of time periods t1 to t2, and t2 to t3. According to a further embodiment, the time periods can be managed by operator 206, such that a safe value of low-p air is applied to adaptor 302 and exhaust system 125 to ensure thorough testing. Those of skill in the art can appreciate that when comparing pressure values, a certain "delta" or difference is to be tolerated between a measured pressure value internal to exhaust system 125 and the applied test pressure value; that is, variances in equipment, and normal operating conditions of exhaust system 125 could cause a small difference in measured pressure values that would not be considered as a failure. These "delta" values can be predetermined, or pre-set, based on empirical testing, and can be adjusted as needed in view of the experience of operator 206.

Following step 722, method 700/ESIT 300 determines whether exhaust system 125 is a dual exhaust system, and if it is, proceeds to step 725 ("Yes" path from decision step 722), which is also a decision step, and which determines whether this is the second iteration for same dual exhaust system 125. If it is a second iteration ("Yes" path from decision step 725), method 700/ESIT 300 proceeds to step 726, in which the test is complete. If, however, the most current iteration is just a first iteration ("No" path from decision step 725), method 700/ESIT 300 returns to step 706, and begins again the process of providing low-p air (as those of skill in the art can appreciate, what typically would happen is that the method would only proceed again after it gave operator 206 enough time to place cap 602 in position, which would be the other exhaust pipe 122a, and perhaps verify that cap 602 had been properly placed).

During steps 718-719-720, operator 206 performs a manual integrity test of exhaust system 125, listening and feeling for leaks. According to an embodiment, one of the chief advantages in use of method 700 and ESIT 300 is that there are no hot exhaust gases 124 to inflict pain and/or injury onto operator 206, and no engine noise so that the integrity of the test improves. Once the "listening" and "feeling" part of the test is complete, operator 206 records the results in step 718. In step 726, operator 206 prepares a report regarding the integrity of exhaust system 125, noting failures, if any, and then method 700 is complete.

In an automated version, many of the steps in method 700 would remain the same. However, once the proper adaptor 302 was inserted, and a second exhaust pipe 122b capped that was not part of a second exhaust system 125b, steps 712 and 714 can be performed automatically via control of test center 332, as discussed above. According to an embodiment, test center 332 can perform steps 712 and 714 upon interaction between operator 206 and test center 332. According to a further embodiment, method step 716 can also be ascertained automatically by monitoring air pressure build-up within ESIT 300, and it can also be determined that a good exhaust system 125 is being tested if a pressure indication is made by transducer 322. Preliminary results can include a failure to maintain low-p air, such that a leak most likely exists, alerting operator 206 to be alert to the presence of a failure in exhaust system 125. Preliminary results can also include a finding that there are no leaks as the low pressure was able to be suitably maintained. However, in the case of a "failure" operator 206 must still perform the verification in order to find the location of the leak.

Figure 9:
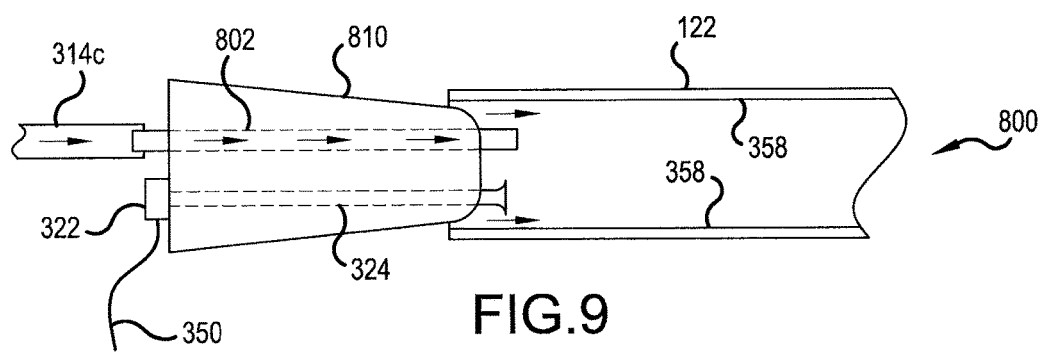
FIG. 9 illustrates an alternate embodiment of an adaptor for use with the exhaust system verification tester shown in FIGS. 3-5 according to a further embodiment.

Although discussion above in regard to adaptor 302 was made in reference to a balloon type object according to an embodiment, those of skill in the art can appreciate that other devices can be used as well. For example, as shown in FIG. 9, within the embodiments, adaptor 810 can be a cone shaped device that can be inserted and fit into exhaust pipe 122. The material of the cone will have enough resiliency that the device can be maintained in the exhaust. Excessive pressure would overcome the force retaining the cone in the exhaust, but the device can still be provided with a one-way valve to relieve excessive pressure.

Figure 10:
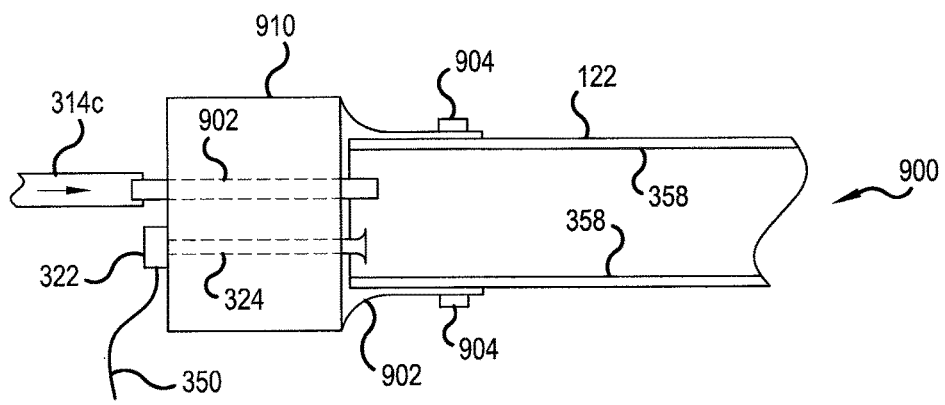
FIG. 10 illustrates another alternate embodiment of an adaptor for use with the exhaust system verification tester shown in FIGS. 3-5 according to a further embodiment.

According to a further embodiment, shown in FIG. 10, adaptor 910 can be made of a hardened substance, incorporating a substantially circular orifice that is fitted or clamped around the end of exhaust pipe 122, which is then tightened about exhaust pipe 122 via quick disconnect clamp 904. Such embodiments are within the scope of embodiments disclosed herein, as well as others not particularly mentioned. FIG. 9 illustrates a different embodiment of the adaptor, which works substantially similar to the embodiment shown and described above in regard to FIGS. 3-6, and also with respect to method 700. For example, as shown in FIG. 9, adaptor 810 includes OPDS 320, including sampling tube 324; low-p air flows through low pressure air input tube 802 into the interior of exhaust system 125, and sampling tube 324 facilitates the monitoring of the expected pressure build-up within exhaust system 125. A similar set up exists in adaptor 910, as shown in FIG. 10. Note that in both FIGS. 9 and 10, with respective adaptors 810 and 910, OPDS 320 has not been completely shown, but according to embodiments can be implemented just as in adaptor 302. Each adapter is provided with a pressure relief valve. The pressure relief valve can be on the conduit 802. 902 supplying the pressurized air, or another conduit can be provided in the body with the pressure relief valve attached to a portion of this conduit that extends from the body.

According to a further embodiment, adaptor 810 can be manipulated by operator 206 when testing exhaust system 125. That is, operator 206 can manually insert adaptor 810 into the exhaust pipe 122 that is under test, and hold it there and begin the test using ESIT 300 according to embodiments disclosed herein, including method 700. Because only cool "shop" air gases—typically air, but can also be nitrogen, among other types of gases—are used to test the integrity of exhaust system 125, operator 206 can hold adaptor 810 in place and remotely start the test using remote control device. Remote control device includes cable or wire that carries start signals (created by pushing button) to the automated testing devices, i.e., test center 322, to begin the test. Operator 206 can also push button to end the test, or the start/stop functions can be combined into pushing one button, as those of skill in the art can appreciate. Furthermore, remote control device operates substantially similarly to that of remote control device with the difference being that remote control device operates wirelessly via antenna. According to further embodiments, remote control device can be integrated into the same device (remote control device), such that there is a wired back up to the wireless signal. The wire or cable can be hidden, i.e., spooled and stored internally to remote control device, or stored in or with test center 322, and connected if for some reason the wireless transmission fails to properly operate (e.g., a dead battery in remote control device).

According to an embodiment, all or portions of method 700 can be implemented in a dedicated processor (not shown in any of FIGS. 1-6), or through the various functional blocks shown in FIG. 3. Those of ordinary skill in the art can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not 1 imitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-u p, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media.

For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, sol id state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments described herein can also be embodied as computer-readable codes on a computer readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments, when implemented in suitable electronic hardware, accomplish or support exercising certain elements of the appended claims can be readily construed by programmers skilled in the art to which the embodiments pertain.

According to a first aspect of the embodiments, a method for verifying the integrity of an exhaust system is provided comprising introducing pressurized gas into an orifice of the exhaust system, and verifying an operating integrity of the exhaust system based on a response by the exhaust system to the pressurized gas.

Still further according to the first aspect of the embodiments, the step of verifying an operating integrity comprises verifying the operating integrity of the exhaust system when a first exhaust system gas pressure increases to a first predetermined test pressure, and determining the exhaust system does not exhibit operating integrity if the first exhaust system gas pressure does not increase to the first predetermined test pressure. According to the first aspect, the method further comprises fitting an adaptor with an orifice of the exhaust system, and wherein the step of fitting comprises selecting the adaptor to fluidly connect to and seal the orifice of the exhaust system.

According to the first aspect, the method further comprises fluidly connecting and sealing the orifice of the exhaust system with the adaptor that fits within the orifice, and fluidly connecting and sealing the orifice of the exhaust system with the adaptor that fits around the orifice. According to the first aspect, the step of introducing pressurized gas comprises pressurizing the gas, monitoring a first pressure of the pressurized gas within the exhaust system, and increasing pressurization of the pressurized gas.

Still further according to the first aspect, the step of verifying comprises determining whether, during a first predetermined time period, the first exhaust system gas pressure increases to a value at least about equal to the first predetermined test pressure such that the exhaust system exhibits operating integrity, and further determining, during the first predetermined time period, whether the first exhaust system gas pressure does not increase to the value at least about equal to the first predetermined test pressure such that the exhaust system fails to exhibit operating integrity. Still further according to the first aspect of the embodiments, the step of verifying further comprises continuing to introduce pressurized gas into the exhaust system through the adaptor at a second predetermined gas pressure, and determining whether, during a second predetermined time period, a second exhaust system gas pressure increases to a value at least about equal to the second predetermined test pressure such that the exhaust system exhibits operating integrity, and further determining, during the second predetermined time period, whether the second exhaust system gas pressure does not increase to the value at least about equal to the second predetermined test pressure such that the exhaust system fails to exhibit operating integrity.

According to the first aspect of the embodiments, the second predetermined gas pressure exceeds a first predetermined gas pressure, and the method further comprises placing a sealing cap on a second orifice of a dual exhaust system prior to introducing pressurized gas into the first orifice of the dual exhaust system through the adaptor and then determining operating integrity of a first portion of the dual exhaust system, and placing the sealing cap on a first orifice of the dual exhaust system prior to introducing pressurized gas into the second orifice of the dual exhaust system through the adaptor and then determining operating integrity of a second portion of the dual exhaust system. According to the first aspect of the embodiments, the method further comprises repeating the steps of determining whether, during a first predetermined time period, the first exhaust system gas pressure increases to a value at least about equal to the first predetermined test pressure such that the exhaust system exhibits operating integrity, and further determining, during the first predetermined time period, whether the first exhaust system gas pressure does not increase to the value at least about equal to the first predetermined test pressure such that the exhaust system fails to exhibit operating integrity, and repeating the step of verifying that further includes continuing to introduce pressurized gas into the exhaust system through the adaptor at a second predetermined gas pressure, and determining whether, during a second predetermined time period, a second exhaust system gas pressure increases to a value at least about equal to the second predetermined test pressure such that the exhaust system exhibits operating integrity, and further determining, during the second predetermined time period, whether the second exhaust system gas pressure does not increase to the value at least about equal to the second predetermined test pressure such that the exhaust system fails to exhibit operating integrity for each of the first portion of the dual exhaust system and the second portion of the dual exhaust system.

According to the first aspect of the embodiments, the adaptor comprises a balloon type device configured to fit into the orifice of the exhaust system, inflate upon introduction of the pressurized gas, and fluidly seal the orifice of the exhaust system.

According to the first aspect of the embodiments the adaptor comprises a semi-rigid device configured to fit against the orifice and fluidly seal the orifice of the exhaust system.

According to the first aspect of the embodiments, the adaptor comprises a device configured to fit around the orifice of the exhaust system, wherein the device includes a fluidly sealing flange configured to fluidly seal the orifice of the exhaust system.

According to the first aspect of the embodiments, the fluidly sealing flange is further configured to include a quick-connect/disconnect apparatus to fluidly seal the sealing flange. According to the first aspect of the embodiments, the method further comprises connecting a retention device to the adaptor and a retention point, such that the retention device is configured to substantially prevent the adaptor from being expelled from the orifice of the exhaust system in the event of an over pressure situation.

According to the first aspect of the embodiments, the method for verifying the integrity of an exhaust system further comprises enabling a pressurized gas generated by a pump to flow into an orifice of the exhaust system, measuring a first gas pressure of the first pressurized gas within the exhaust system, and verifying an operating integrity of the exhaust system when the first gas pressure within the exhaust system increases to a predetermined test pressure, and determining the exhaust system does not exhibit operating integrity if the first gas pressure gas does not increase to the predetermined test pressure.

According to the first aspect of the embodiments, the step of enabling comprises fitting an adaptor about an orifice of the exhaust system, and introducing pressurized gas into the orifice of the exhaust system through the adaptor, further wherein the step of fitting comprises selecting the adaptor to fluidly connect to and seal the orifice of the exhaust system, fluidly connecting and sealing the orifice of the exhaust system with the adaptor that fits within the orifice.

According to the first aspect of the embodiments, the step of introducing pressurized gas comprises pressurizing the gas monitoring a first pressure of the pressurized gas within the exhaust system, and increasing pressurization of the pressurized gas.

According to the first aspect of the embodiments, the step of verifying comprises determining whether, during a first predetermined time period, the first gas pressure increases to a value at least about equal to the predetermined test pressure such that the exhaust system exhibits operating integrity, and further determining, during the first predetermined time period, the first gas pressure does not increase to the value at least about equal to the predetermined test pressure such that the exhaust system fails to exhibit operating integrity, and continuing to introduce pressurized gas into the exhaust system through the adaptor at a second predetermined gas pressure if the first gas pressure does not increase to the value at least about equal to the predetermined test pressure, and determining whether, during a second predetermined time period, the first gas pressure increases to a value at least about equal to the second predetermined test pressure such that the exhaust system exhibits operating integrity, and further determining, during the second predetermined time period, whether the second pressure does not increase to the value at least about equal to the second predetermined test pressure such that the exhaust system fails to exhibit operating integrity.

According to the first aspect of the embodiments, the method further comprises placing a sealing cap on a second orifice of a dual exhaust system prior to introducing pressurized gas, and placing the sealing cap on a first orifice of the dual exhaust system following the steps of introducing pressurized gas, determining the first gas pressure during a first predetermined time period, determining the second gas pressure during a second time period, if necessary.

According to a second aspect of the embodiments, an exhaust system verification apparatus (apparatus) for verifying the integrity of an exhaust system is provided comprising a gas pump apparatus configured to introduce pressurized gas into the orifice of the exhaust system, and a gas pressure detection apparatus configured to verify an operating integrity of the exhaust system based on a response of the exhaust system to the pressurized gas. According to the second aspect of the embodiments, the pressure detection apparatus is further configured to verify an operating integrity of the exhaust system when a first exhaust system gas pressure increases to a first predetermined test pressure, and wherein the pressure detection apparatus is further configured to determine the exhaust system does not exhibit operating integrity if the first exhaust system gas pressure does not increase to the first predetermined test pressure.

According to the second aspect of the embodiments, the apparatus further comprises an adaptor configured to fit with an orifice of the exhaust system, and wherein the adaptor is further configured to fluidly connect to and seal the orifice of the exhaust system.

According to the second aspect of the embodiments, the adaptor is further configured to fluidly connect to and seal the orifice of the exhaust system with the adaptor that fits within the orifice. According to the second aspect of the embodiments, the adaptor is further configured to fluidly connect to and seal the orifice of the exhaust system with the adaptor that fits around the orifice. According to the second aspect of the embodiments, the adaptor comprises a balloon type device configured to fit into the orifice of the exhaust system, inflate upon introduction of the pressurized gas, and fluidly seal the orifice of the exhaust system. According to the second aspect of the embodiments, the adaptor comprises a semi-rigid device configured to fit into the orifice and fluidly seal the orifice of the exhaust system.

According to the second aspect of the embodiments, the adaptor comprises a device configured to fit around the orifice of the exhaust system, wherein the device includes a fluidly sealing flange configured to fluidly seal the orifice of the exhaust system, and further wherein the fluidly sealing flange is further configured to include a quick-connect/disconnect apparatus to fluidly seal the sealing flange.

According to the second aspect of the embodiments, a first portion of the pressure detection apparatus is part of the adaptor and wherein the first portion is configured to measure an internal gas pressure of the exhaust system, and further wherein the first portion of the pressure detection apparatus comprises a pressure transducer, and a gas transfer device configured to allow substantially free flow of gas from an internal portion of the exhaust system to the pressure transducer, the gas transfer device fluidly connected to the pressure transducer.

According to the second aspect of the embodiments, the pressure detection apparatus is further configured to detect, during a first predetermined time period, whether the first exhaust system gas pressure increases to a value at least about equal to the first predetermined test pressure such that the exhaust system exhibits operating integrity, and is further configured to detect, during the first predetermined time period, whether the first exhaust system gas pressure does not increase to the value at least about equal to the first predetermined test pressure such that the exhaust system fails to exhibit operating integrity. According to the second aspect of the embodiments the air pump apparatus is further configured to continue to introduce pressurized gas into the exhaust system through the adaptor at a second predetermined gas pressure at an end of the first predetermined time period, and wherein the air pressure detection apparatus is further configured to detect, during a second predetermined time period, whether a second exhaust system gas pressure increases to a value at least about equal to the second predetermined test pressure such that the exhaust system exhibits operating integrity, and is further configured to detect, during the second predetermined time period, whether the second exhaust system gas pressure does not increase to the value at least about equal to the second predetermined test pressure such that the exhaust system fails to exhibit operating integrity.

According to the second aspect of the embodiments, the second predetermined gas pressure exceeds a first predetermined gas pressure, and wherein the apparatus further comprises a sealing cap configured to be placed on a second orifice of a dual exhaust system prior to introducing pressurized gas into the first orifice of the dual exhaust system through the adaptor and then determining operating integrity of a first portion of the dual exhaust system, wherein the sealing cap is further configured to substantially fluidly seal the second orifice of the dual exhaust system, and wherein the sealing cap is further configured to be placed on a first orifice of the dual exhaust system prior to introducing pressurized gas into the second orifice of the dual exhaust system through the adaptor and then determining operating integrity of a second portion of the dual exhaust system, and wherein the sealing cap is further configured to substantially fluidly seal the first orifice of the dual exhaust system.

According to the second aspect of the embodiments, the apparatus further comprises a retention device configured to be removably attached to the adaptor and a retention point, such that the retention device is further configured to substantially prevent the adaptor from being expelled from the orifice of the exhaust system in the event of an over pressure situation. According to the second aspect of the embodiments, the apparatus further comprises a testing apparatus, the testing apparatus including at least a processing device, and wherein the processing device is configured to cause the air pump to introduce pressurized air into the exhaust system, at one or more air pressures, each of the one or more of air pressures being introduced for a respective predetermined period of time; and further wherein, the processing device is configured to monitor gas pressure at at least one of an output of the air pump, and internally to the exhaust system.

According to the second aspect of the embodiments, the processing device is further configured to determine, during a first predetermined time period, whether the first exhaust system gas pressure increases to a value at least about equal to the first predetermined test pressure such that the exhaust system exhibits operating integrity, and is further configured to detect, during the first predetermined time period, whether the first exhaust system gas pressure does not increase to the value at least about equal to the first predetermined test pressure such that the exhaust system fails to exhibit operating integrity.

According to the second aspect of the embodiments, the processing device is further configured to cause the air pump apparatus to continue to introduce pressurized gas into the exhaust system through the adaptor at a second predetermined gas pressure at an end of the first predetermined time period, and wherein the testing apparatus is further configured to detect, during a second predetermined time period, whether a second exhaust system gas pressure increases to a value at least about equal to the second predetermined test pressure such that the exhaust system exhibits operating integrity, and is further configured to detect, during the second predetermined time period, whether the second exhaust system gas pressure does not increase to the value at least about equal to the second predetermined test pressure such that the exhaust system fails to exhibit operating integrity. Still further according to the second aspect of the embodiments, the testing apparatus further comprises a display means, one or more interface devices, the interface devices including at least one of a mouse, touch screen, keyboard, data ports, audio indicators, and visual indicators, and a memory configured to store a program of executable instructions on a non-transitory computer readable medium, wherein the program includes a set of instructions configured to operate the system and exchange data and commands with at least one of the adaptor, air pump, and pressure detection apparatus.

According to a third aspect of the embodiments, a method for verifying the integrity of an exhaust system is provided, the method comprising enabling a pressurized gas to flow into an orifice of the exhaust system by fitting an adaptor around an orifice of the exhaust system by selecting the adaptor to fluidly connect against and seal the orifice of the exhaust system, and fluidly connecting and sealing the orifice of the exhaust system with the adaptor that fits within the orifice, and introducing pressurized gas into the orifice of the exhaust system through the adaptor, measuring a first gas pressure of the first pressurized gas within the exhaust system, and verifying an operating integrity of the exhaust system by determining whether, during a first predetermined time period, the first gas pressure increases to a value at least about equal to the predetermined test pressure such that the exhaust system exhibits operating integrity, and further determining, during the first predetermined time period, the first gas pressure does not increase to the value at least about equal to the predetermined test pressure such that the exhaust system fails to exhibit operating integrity, continuing to introduce pressurized gas into the exhaust system through the adaptor at a second predetermined gas pressure if the first gas pressure does not increase to the value at least about equal to the predetermined test pressure, and determining whether, during a second predetermined time period, the first gas pressure increases to a value at least about equal to the second predetermined test pressure such that the exhaust system exhibits operating integrity, and further determining, during the second predetermined time period, whether the second pressure does not increase to the value at least about equal to the second predetermined test pressure such that the exhaust system fails to exhibit operating integrity.

The above-described embodiments are intended to be illustrative in all respects, rather than restrictive. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

I claim:
1. A method for verifying the integrity of an exhaust system, comprising:
fitting an adaptor with an orifice of the exhaust system;
introducing pressurized gas into the exhaust system through the adaptor; and verifying an operating integrity of the exhaust system based on a response by the exhaust system to the pressurized gas, wherein the step of verifying comprises determining whether, during a first predetermined time period, the first exhaust system gas pressure increases to a value at least about equal to the first predetermined test pressure such that the exhaust system exhibits operating integrity, and further determining, during the first predetermined time period, whether the first exhaust system gas pressure does not increase to the value at least about equal to the first predetermined test pressure such that the exhaust system fails to exhibit operating integrity, continuing to introduce pressurized gas into the exhaust system at a second predetermined gas pressure; and determining whether, during a second predetermined time period, a second exhaust system gas pressure increases to a value at least about equal to the second predetermined test pressure such that the exhaust system exhibits operating integrity, and further determining, during the second predetermined time period, whether the second exhaust system gas pressure does not increase to the value at least about equal to the second predetermined test pressure such that the exhaust system fails to exhibit operating integrity.

2. The method according to claim 1, further comprising: connecting a retention device to the adaptor and a retention point, such that the retention device is configured to substantially prevent the adaptor from being expelled from the orifice of the exhaust system in the event of an over pressure situation.

3. An exhaust system verification apparatus for verifying the integrity of an exhaust system, comprising:
an adaptor configured to seal an orifice of the exhaust system, and fluidly connect to and seal the orifice of the exhaust system, the adaptor having a sidewall and an end wall, the end wall preventing gas flow through the orifice;
a gas pump apparatus configured to introduce pressurized gas into an orifice of the exhaust system; and
a gas pressure detection apparatus configured to verify an operating integrity of the exhaust system based on the exhaust system maintaining the increased pressure
wherein a first portion of the pressure detection apparatus is part of the adaptor and wherein the first portion is configured to measure an internal gas pressure of the exhaust system,
wherein the first portion of the pressure detection apparatus includes a pressure transducer, and
wherein a gas transfer device configured to allow substantially free flow of gas from an internal portion of the exhaust system to the pressure transducer, the gas transfer device fluidly connected to the pressure transducer.

4. The apparatus according to claim 3, wherein the gas pressure detection apparatus is further configured to:

detect, during a first predetermined time period, whether the first exhaust system gas pressure increases to a value at least about equal to the first predetermined test pressure such that the exhaust system exhibits operating integrity, and detect, during the first predetermined time period, whether the first exhaust system gas pressure does not increase to the value at least about equal to the first predetermined test pressure such that the exhaust system fails to exhibit operating integrity.

5. The apparatus according to claim 3, wherein the gas pump apparatus is further configured to continue to introduce pressurized gas into the exhaust system through the adaptor at a second predetermined gas pressure at an end of the first predetermined time period, and wherein the gas pressure detection apparatus is further configured to detect, during a second predetermined time period, whether a second exhaust system gas pressure increases to a value at least about equal to the second predetermined test pressure such that the exhaust system exhibits operating integrity, and is further configured to detect, during the second predetermined time period, whether the second exhaust system gas pressure does not increase to the value at least about equal to the second predetermined test pressure such that the exhaust system fails to exhibit operating integrity.

6. The apparatus according to claim 3, wherein the adaptor comprises a balloon type device configured to fit into the orifice of the exhaust system, inflate upon introduction of the pressurized gas, and fluidly seal the orifice of the exhaust system.

7. The apparatus according to claim 3, wherein the adaptor comprises a semi-rigid device configured to fit into the orifice and fluidly seal the orifice of the exhaust system.

8. The apparatus according to claim 3, further comprising:
a retention device configured to be removably attached to the adaptor and a retention point, such that the retention device is further configured to substantially prevent the adaptor from being expelled from the orifice of the exhaust system in the event of an over pressure situation.

9. The apparatus according to claim 3, wherein the adaptor is further configured to fluidly connect and seal the orifice of the exhaust system with the adaptor that fits around the orifice.

10. The apparatus according to claim 9, wherein the adaptor comprises:
a device configured to fit around the orifice of the exhaust system,
wherein the device includes a fluidly sealing flange configured to fluidly seal the orifice of the exhaust system, and
wherein the fluidly sealing flange is further configured to include a quick-connect/disconnect apparatus to fluidly seal the sealing flange.

* * * * *